April 17, 1934.  H. H. BLAU  1,955,451
METHOD OF CONTROLLING THE COMPOSITION OF GLASS
Filed Aug. 8, 1932
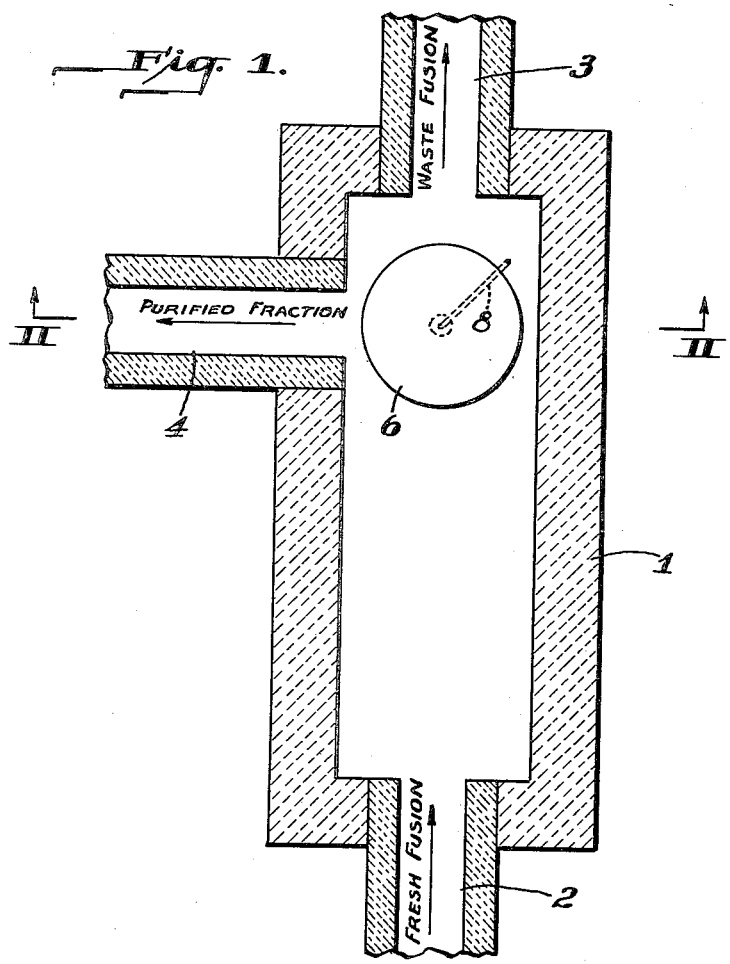
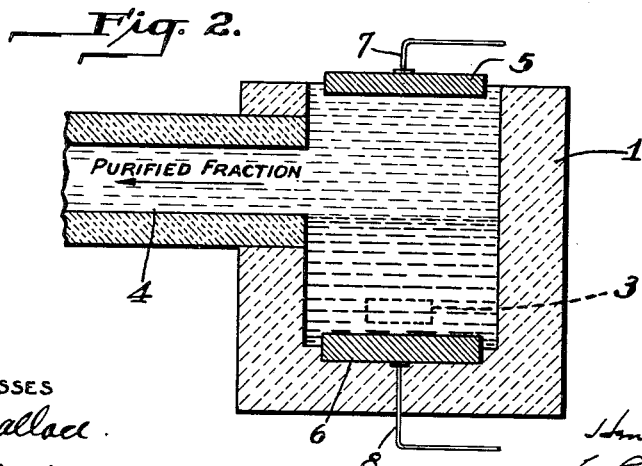

Patented Apr. 17, 1934

1,955,451

UNITED STATES PATENT OFFICE 1,955,451

METHOD OF CONTROLLING THE COMPOSITION OF GLASS

Henry H. Blau, Charleroi, Pa., assignor to Macbeth-Evans Glass Company, Charleroi, Pa., a corporation of Pennsylvania Application August 8, 1932, Serial No. 627,893

14 Claims. (Cl. 204—19)

This invention relates to the manufacture of glass, and particularly to processes for modifying the composition of glasses in the fused state.

The production of glasses high in fourth group oxides, e. g. those containing about 80 to 90 or more percent of silica, and especially those free from or low in second group oxides, has been attended by certain difficulties. For instance, the melting range of glasses rises rapidly as the content of first group or alkali oxides is decreased and that of fourth group oxides is increased. This makes such glasses more difficult to melt than those of lower silica content, and other objectionable operating and fabricating features are introduced. These and other factors have militated against the wide adoption and use of such high-silica glasses, for up to the present time the only means of making them has been by the customary mode of melting batches adapted to produce the desired composition.

Certain agents normally present in small amounts in glass-forming materials exert harmful influences upon various properties of the finished glasses. For instance, iron and titanium may have a harmful influence upon the absorption and/or transmission characteristics of glasses intended for special purposes, and small amounts of other substances may show a deleterious action upon other properties, e. g. the viscosity of the melt, the lustre or hardness, etc. of the finished glass. These substances are generally introduced as impurities, for example in sands and limestone, and even very high grade materials may contain enough of them to exert an adverse effect. The elimination of most materials of this type has not been commercially feasible, partly because of the excessive cost of batch ingredients free from them. Also, even when especially pure batches are used some of these substances, e. g. iron oxide, titania and alumina, may be picked up during melting and working, as from refractories, scale, tools, etc.

It is among the objects of this invention to provide a method for modifying the composition of glasses in the fused state, which is simple and readily practiced, by which undesirable oxides are fractionated out or removed from the melt, particularly for the production of glasses containing 80 to 90 or more percent of silica or other fourth group oxide, which may be used to eliminate impurities having an undesired effect upon the glass to provide glasses of great purity, and in the practice of which glass making ingredients of extraordinary quality are unnecessary.

The invention will be described with reference to the accompanying drawing in which Fig. 1 is a horizontal sectional view through a glass tank showing a working chamber suitable for the practice of the invention; and Fig. 2 a cross section taken on line II—II, Fig. 1.

In accordance with the invention the composition of glass melts is modified by a fractionation process founded primarily on ionic transport phenomena. In the practice of the invention a direct electric current is passed through the fused glass as an electrolyte, the potential of the current being regulated to cause an undesired constituent to migrate from one region of the melt toward another, and thus to alter the concentration of one region of the melt with regard to a particular oxide constituent, e. g. by impoverishing such region of an undesired oxide. This not only changes the concentration of that oxide, but also the concentration of the oxides remaining in that region, whereby the invention is applicable to the control of concentration in either respect, or both. The fractionally purified region is then withdrawn for use.

In other words, in the process contemplated the phenomenon involved primarily is that of transport of a certain ion, or ions, from one region of the electrolyte so as to impoverish that region of such ion, which moves, under the influence of the electric current, to another region of the melt. Usually such a process will involve electrodeposition, but in accordance with this invention any electrodeposition is incidental to the main phenomenon used, i.e. simple ionic transport. That is, the purification of the electrolyte results chiefly from simple movement of ions from the region of, for example, the anode, toward the other electrode, without the entire quantity of such ions being deposited at the other electrode, in accordance with well known transport phenomena.

The distinction between this and other processes may be understood further by consideration of any of the usual electrolyte purification processes now used in various industries, e.g. the electrolysis of metal solutions to remove impurities. In such procedures it is necessary to effect deposition of all of the particular impurity, by passing a suitable direct current through the electrolyte until it contains no more of the impurity. If all of the impurity is not deposited the desired result is not obtained. In the method of this invention, however, the current is applied primarily to move the undesired oxide from the melt in the region of one electrode into another region, and the two regions are then separated, one being impoverished of the impurity, and the other being enriched in it, due to transport phenomena. Thus it is unnecessary to effect complete deposition of that impurity. It is because of these distinctions that the process of this invention is termed fractionation.

The invention is applicable generally to the modification of glass melt compositions. For instance, it may be applied to the removal of titanium and iron oxides from the customary melts used in making glasses for transmitting ultra-violet radiation, so as to eliminate the adverse effects of such agents upon the transmitting qualities of the glasses. Likewise, it may be used for removing other undesired oxides for special purposes.

A particular application of the invention resides in the production of glasses containing very high percentages of fourth group oxides, e. g. silica. This aspect of the invention preferably is applied to glasses which can be melted readily at temperatures below those needed to produce high silica, or pure silica, or other fourth group oxide glasses by ordinary methods. Fusion of such batches is easy, being accomplished in the usual tanks or the like without the difficulties which normally attend the fusion of glasses high in these oxides. Any suitable batch or melt may be used for this purpose, the main criterion being the use of a glass which can be melted readily, whose fluxing oxides can be removed by the process of the invention, and which contains the fourth group oxide, such as silica, desired in the final composition. In general the most desirable results will be had through the use of batches containing as few constituents as possible, such as a simple soda glass, and to avoid constituents which may be reduced by the current in such manner as to adversely affect the final product. The various alkali and alkaline earth oxides, such as those of sodium potassium, calcium and zinc, commonly used in glass, all act to reduce the melting point of silica. These and other oxides may be considered as being undesired oxides, since they reduce the content of silica, and are removed to make the high silica product.

Other applications of the invention than those just referred to will suggest themselves to those skilled in the art, as, for example, the preparation of glasses of special composition, or of great purity. Moreover, through the practice of the invention cheaper or less pure ingredients may be used, as in producing present commercial glass compositions.

After the batch has been melted it is subjected to a direct current passed between electrodes immersed in the melt to remove the undesired oxide, or oxides, the potential of the current being adjusted suitably to that end. Such control of potential may be applied also to simultaneously effect necessary temperature adjustments. Because the potential will vary according to the character and composition of the glass undergoing treatment, and according to the end desired, it is not feasible to give exact voltages and current densities suitable for all compositions. For instance it will vary according to the particular oxides present, and where several such oxides are present it will depend upon whether one or more are to be removed. However, as will be understood by those familiar with the art, the particular electrical and thermal relations for any particular glass may be determined as needed.

The invention may be practiced in various ways. For instance, the glass may be melted in a tank and subjected to a direct electric current passed between electrodes positioned appropriately in a suitable portion of the tank, e.g. in a throat. Or, the glass melt may form an anolyte in contact with a suitable catholyte which receives the undesired oxide removed from the glass. In the preferred embodiment the fractionation takes place in a separate purifying or working chamber having electrodes inserted through the top and bottom. When the desired degree of impoverishment has taken place the purified portion of the melt is withdrawn for working. The portion enriched in undesired oxide is also withdrawn and used in any manner for which it is fitted, as for making common glass articles. Care is taken to avoid turbulence in the melt, so as to avoid mixing of the regions which have been impoverished and enriched, respectively, in undesired oxide.

The invention may be understood further by reference to the accompanying drawing showing one means for its practice. Glass melt enters a purifying chamber 1 through a throat 2 from a tank, not shown. Chamber 1 is provided at the end opposite throat 2 with an end outlet 3 adjacent the bottom, and a side outlet 4 arranged to draw off melt from the upper portion of the chamber. Electrodes 5 and 6 mounted in the top and bottom of the chamber adjacent outlet 4 are connected respectively by leads 7 and 8 to the positive and negative sides of a suitable source of direct current, not shown.

Glass melt 9 enters through throat 2 and as it passes through chamber 1 is subjected to the action of the direct current flowing between the electrodes. The current is regulated as described hereinabove. Under its action undesired oxides migrate toward electrode 6, thus impoverishing the melt in the upper part of the chamber. This action is indicated by lighter shading of the melt in the vicinity of outlet 4, through which fractionated fusion is withdrawn. The common, or waste, fusion containing the oxides carried out of the refined fusion is withdrawn from outlet 3. The invention may, of course, be practiced in other ways and with other apparatus.

As the melt becomes impoverished in basic oxides the temperature necessary to obtain a desired viscosity value ordinarily increases. The temperature necessary may be obtained by means of the control referred to hereinabove, or if preferred the heating effect of the fractionating current may be amplified by any other suitable means, such as those known in the art. For instance, in the apparatus shown auxiliary heat may be introduced from the top of the chamber. This would provide a temperature gradient such that the maximum temperature would be at the top of the melt, which would be desirable in most cases.

In this manner a glass low in silica may be converted to one high in silica, by simple removal of basic oxides, the silica content correspondingly increasing as the basic oxides are removed. By carrying out the process to a point such that the glass is free, or substantially free, from basic oxides, a product consisting substantially of fused silica may be obtained, and this is equally contemplated in the claims when reference is made to glasses high in silica.

Other desired changes in composition may be effected by proper selection of conditions, as will be understood from what has been said. Thus the content of constituents may be regulated to control their effect upon the physical or chemical properties of the glass. For instance, impurities which adversely affect the lustre, hardness, transmissivity for radiation of certain wave lengths, and other properties may be removed, either singly or simultaneously with other undesired oxides. A particular example of the benefit of such purification resides in the ability to produce glasses having desired absorption characteristics. For example, iron and other impurities exert an adverse effect upon the color appearance of glass, either coloring glasses intended to be colorless, or affecting the tint of colored glasses. In the practice of this process such impurities may be fractionated out to provide glasses of desired pure color appearance.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically illustrated and described.

I claim:

1. A method of modifying the composition of glass in the fused state comprising melting a glass batch, fractionating the glass by passing a direct electric current through the melt as an electrolyte, regulating the potential of the current to alter the concentration of a particular oxide of the batch in one region of the melt primarily by migration of such constituent from one region of the melt toward another, to thereby produce a fraction of desired composition, and withdrawing the fractionated region of desired composition.

2. A method of modifying the composition of glass in the fused state comprising melting a glass batch, fractionating the glass by passing a direct current through the melt as an electrolyte, regulating the potential of the current to alter the concentration of a particular oxide in a region of the melt primarily by migration of such constituent from one region of the melt to another under the influence of electrical and thermal conditions in the melt to thereby produce a fraction of desired composition and withdrawing the fractionated portion of the melt.

3. A method of modifying the composition of glass in the fused state comprising melting a glass batch, fractionating the glass by passing a direct electric current through the melt as an electrolyte, regulating the potential of the current to impoverish the melt in the region of the anode of an undesired oxide primarily by migration of such constituent therefrom, and withdrawing the fractionated anode portion of the melt from the portion of the melt enriched in undesired oxide.

4. A method of modifying the composition of glass in the fused state comprising melting a glass batch, fractionating the melt by passing a direct electric current through an electrolyte including said melt as anolyte, the electrical and thermal conditions being regulated to cause the anolyte to be impoverished of an undesired oxide primarily by migration of said oxide to another region, and withdrawing the fractionated anolyte region from the portion of the melt enriched in undesired oxide.

5. A method of making glass high in fourth group glass-forming oxide from a melt relatively low in such oxide and relatively high in undesired oxide, comprising melting the batch, fractionating the melt by passing through it as an electrolyte a direct electric current whose potential is regulated to impoverish a region of the melt of said undesired oxide primarily by migration toward another region, whereby to enrich said first-named region in fourth group oxide, and withdrawing the fractionated region rich in fourth group oxide from the portion enriched in undesired oxide.

6. A method according to claim 5, said fourth group oxide being silica.

7. A method of making glass containing upwards of 80 percent of silica, comprising preparing a glass melt containing glass-forming oxides together with silica in an amount less than 80 percent, fractionating the melt by passing a direct electric current through it, regulating the electrical and thermal conditions to impoverish the anode region of said glass-forming oxides primarily by migration to another region, and thereby enriching said anode region in silica, and withdrawing the fractionated anode region thus enriched in silica from the portion enriched in undesired oxide.

8. A method of modifying the composition of glass in the fused state comprising melting a glass batch, fractionating the glass by passing a direct electric current through the melt as an electrolyte, regulating the electrical and thermal conditions to impoverish a region of the melt of undesired oxide primarily by migration of such constituent toward another region and to obtain a desired viscosity value, and withdrawing the fractionated region from the portion of the melt enriched in undesired oxide.

9. A method of modifying the composition of glass in the fused state comprising melting a glass batch containing fourth group glass-forming oxide and an oxide undesired in the glass, fractionating the melt by passing a direct electric current through it as an electrolyte, regulating the electrical and thermal conditions to impoverish a region of the melt of said undesired oxide primarily by migration to another region and to obtain a desired viscosity value, whereby the first-named region is fractionally enriched in said fourth group oxide, and withdrawing the fractionated region from the portion of the melt enriched in undesired oxide.

10. A method according to claim 9, said fourth group oxide being silica, the melt containing less than and the fractionated region containing upwards of 80 percent of silica.

11. A method of making glass of high purity comprising melting a glass batch containing undesired oxide impurity in relatively small amount, fractionating the melt by passing a direct electric current through it as an electrolyte, regulating the current to impoverish a region of the melt of said oxide impurity primarily by migration of such constituent toward another region, and separating the fractionated region from that enriched in said impurity.

12. A method of modifying the composition of glass in the fused state to produce glass having desired absorption characteristics, comprising melting a glass batch containing impurity adversely affecting said characteristic, fractionating the glass by passing a direct electric current through the melt as an electrolyte, regulating the current to impoverish a region of the melt of said impurity primarily by migration of such constituent therefrom, and separating the fractionated region of the melt from that enriched in such impurity.

13. A method of making glass low in iron from a melt containing iron, comprising fractionating the melt by passing a direct electric current through it as electrolyte, the potential of said current being regulated to remove the iron from the anode region into the cathode region primarily by migration under the influence of the current, and separating the iron-impoverished anode region from the cathode region enriched in iron.

14. A process according to claim 8, the thermal conditions being regulated in part or entirely by heat applied externally of the melt.

HENRY H. BLAU.